United States Patent [19]
Willhelm

[11] 4,367,016
[45] Jan. 4, 1983

[54] FLAT FIELD LENS WITH IMAGE SPLITTING EFFECT

[75] Inventor: Joerg Willhelm, Wetzlar, Fed. Rep. of Germany

[73] Assignee: Ernst Leitz Wetzlar GmbH, Wetzlar, Fed. Rep. of Germany

[21] Appl. No.: 140,183

[22] Filed: Apr. 14, 1980

[30] Foreign Application Priority Data

Apr. 14, 1979 [DE] Fed. Rep. of Germany ... 7911041[U]

[51] Int. Cl.³ .................... G02B 3/08; G03B 13/02
[52] U.S. Cl. .................... 350/452; 354/219
[58] Field of Search ........... 350/167, 351, 352, 211, 350/452; 354/199, 200, 219

[56] References Cited

U.S. PATENT DOCUMENTS

| | | | |
|---|---|---|---|
| 3,004,470 | 10/1961 | Rühle | 350/437 |
| 3,523,720 | 8/1970 | Schiele | 350/452 |
| 3,740,119 | 6/1973 | Sakurai et al. | 350/167 |
| 4,057,048 | 11/1977 | Maine | 350/167 |
| 4,076,384 | 2/1978 | Daml et al. | 350/452 X |

*Primary Examiner*—John K. Corbin
*Assistant Examiner*—Scott J. Sugarman
*Attorney, Agent, or Firm*—Schwartz, Jeffery, Schwaab, Mack, Blumenthal & Koch

[57] ABSTRACT

Disclosed is a flat field lens having an image splitting effect, comprising a generally planar lens of substantially transparent material having an optical axis; and a plurality of deformations of identical cross-sectional configuration formed on concentric paths about the optical axis of the transparent lens. Each of the deformations has at least two light-refracting surfaces which are symmetrical to an axis of the deformation, wherein the axis of symmetry of each deformation lying on the same concentric path has the same inclination with respect to the optical axis, and the inclination of the axes of symmetry of deformations located on radially adjacent concentric paths varies, preferably constantly, with respect to the optical axis.

13 Claims, 3 Drawing Figures

FLAT FIELD LENS WITH IMAGE SPLITTING EFFECT

BACKGROUND OF THE INVENTION

The present invention concerns a flat field lens and more especially a flat field lens capable of producing an image splitting effect.

Flat field lenses are usually constructed in the form of Fresnel echelon lenses. They are used, for example, in or in the vicinity of an intermediate image plane in single lens reflex cameras to brighten the view finder image. In this way, the field lens reproduces the pupil of the camera lens in the pupil of the eye of the observer.

Other optical structural elements in the intermediate image plane serve to make possible a sharp focusing of the view finder image. These consist of either ground glass plates, prism grids, wedge splitters or other image splitting structures.

The field lens and the image splitting structures may be arranged adjacently to each other in the same plane, whereby the central part is used for sharpness of focus adjustment and the periphery for the brightening of the image. Such an arrangement is known, for example, from the *Journal Feingeraetetechnik* (1963) pages 330–332 and 366–373. The focusing screen described therein comprises in a center annular zone a measuring field which consists of annular prism or cylindrical lenses placed concentrically with respect to each other and arranged on the flat side of a conventional plano-convex lens. These elements produce dual images outside the focusing plate, with the coincidence of the images represent the focusing criterion. The arrangement possesses increased focusing accuracy and enhanced image luminous density in comparison with ground glass focusing arrangements. There is, however, the disadvantage that only a small section of the image is available for focusing. Because of the absence of light scattering elements, observation of the image composition in the usual manner provided by the ground glass observation device is not possible either in the measuring field or in the surrounding Fresnel field.

SUMMARY OF THE INVENTION

It is therefore an object of the present invention to provide an improved flat field lens.

It is a further object of the invention to provide an improved flat field lens combining over its entire area, in the same plane, the property of pupil reproduction with the possibility of observing the image and of focusing with enhanced luminous density.

In accomplishing the foregoing objects, there has been provided according to the present invention a flat field lens having an image splitting effect, comprising a generally planar lens of substantially transparent material having an optical axis; and a plurality of deformations of identical cross-sectional configuration formed on concentric paths about the optical axis of the transparent lens. Each of the deformations has at least two light-refracting surfaces which are symmetrical to an axis of the deformation, wherein the axis of symmetry of each deformation lying on the same concentric path has the same inclination with respect to the optical axis, whereas the inclination of the axes of symmetry of deformation located on radially adjacent concentric paths varies, preferably constantly, with respect to the optical axis. Most preferably, the lens comprises the form of a Fresnel echelon lens, comprising concentric steps each having an effective flank, and the deformations are located on the effective flank of the individual steps.

Further objects, features and advantages of the present invention will become apparent to a person of ordinary skill in the art from the detailed description of preferred embodiments which follows, when considered together with the attached figures of drawing.

DETAILED DESCRIPTION OF PREFERRED EMBODIMENTS

The invention provides a flat field lens having an image splitting effect. The lens comprises deformations of equal cross-sections located on concentric paths, with at least two refracting surfaces having a symmetrical axis, wherein the inclination of the symmetry axis of the deformation located on the same path is constant with respect to the optical axis of the field lens but varies constantly in the radial direction on the concentric paths.

The deformations may comprise elevations or depressions. The constant variation of the inclination of the symmetry axis may be increasing or decreasing, depending on whether a collecting or scattering effect of the field lens is to be achieved. In one specific embodiment, the field lens may be constructed in the form of a Fresnel echelon lens, wherein the deformations are located on the effective flank of the individual steps. The deformation may have the configuration of a prismatic or a cylindrical lens. In another embodiment of the field lens, each path may consist of a row of successive deformations, each deformation having the shape of a pyramid, a cone or a spherical cap.

Figure 1:
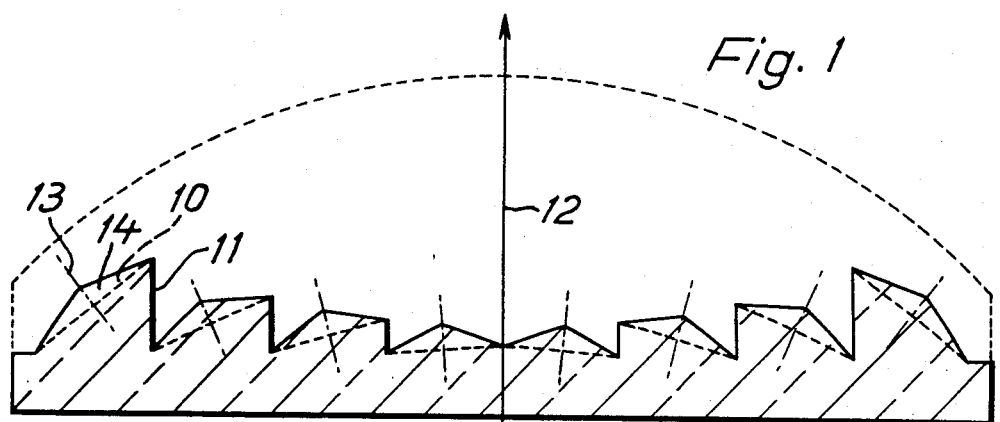
FIG. 1 is a schematic sectional view through a Fresnel echelon lens with prismatic rings set upon the effective flanks.

Referring now to the illustrative embodiments shown in the drawings, in FIG. 1 a plano-convex lens is represented in section by the broken line. By approximating the individual circular arc sections of the convex side of the lens with the use of their chords and by displacing the individual optically-refracting zones together into a plane, a Fresnel echelon lens having a saw tooth cross sectional profile is created. The steps consist in each case of an effective flank 10 and interference flank 11. The interference flanks are aligned parallel to the optical axis 12 of the lens. The inclination of the normal 13 to the effective flanks 10 steadily increases with respect to the optical axis 12 in the radial direction. Fresnel echelon lenses of this known design focus parallel incident light beams at least approximately in one point on the optical axis 12.

According to one embodiment of the invention, elevations 14 with triangular cross sections are set upon the effective flanks 10. All of the elevations on the differentially inclined effective flanks have the same base angle, if the effective flank 10 is designated the base. The normals 13 on the effective flanks 10 are symmetry axes of the elevations 14. Because of the rotational symmetry of the Fresnel echelon lens to the optical axis 12, the elevations 14 represent prism rings.

Figure 2:
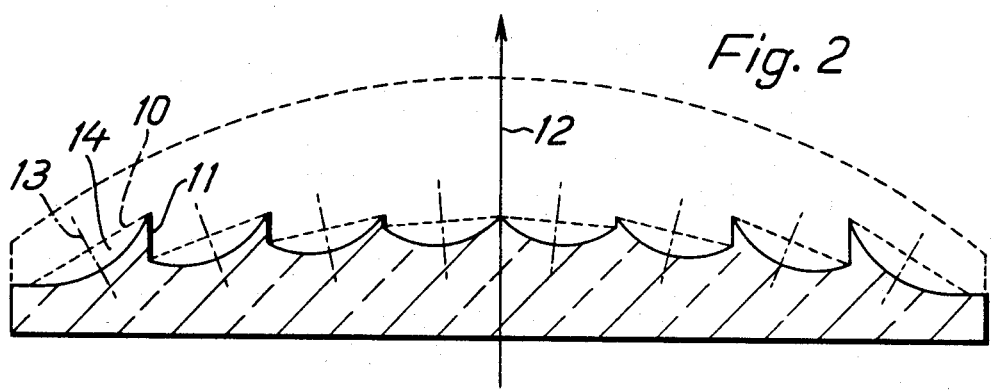
FIG. 2 is a schematic sectional view through a Fresnel echelon lens having cylindrical lens rings impressed into the effective flanks.

In FIG. 2, the conditions concerning the construction of the Fresnel echelon lens are similar to those in FIG. 1. According to this alternative embodiment of the invention, however, the effective flank 10 is impressed in the shape of a circular arc. All impressions have the same radius of curvature, with the center of curvature being located on the normal 13.

Viewed from above, the impressions represent cylindrical lens rings.

From the literature reference cited hereinabove, the image splitting effect in prismatic rings and cylindrical rings of this type is known, however, in the case where their symmetry axes are parallel to each other and the reproducing effect of a plano-convex lens is arranged subsequent to the image splitting elements. Experiments have shown that both effects may be combined in a single plane by means of the invention. In this manner, a flat field lens is obtained, which over its entire surface area both contributes to the brightening of the image and is suitable for image focusing. With an adequate fineness of the grooved structure, an observation of the image comparable to that viewed with a ground glass element is possible.

Further approximation of the scattering of a ground glass plate is obtained by providing the elevations or depressions described hereinabove, not in a continuous closed annular form, but as individual symmetrical deformations located on a path. These deformations have a larger number of refracting surfaces. An example of such an embodiment is shown in FIG. 3.

Figure 3:
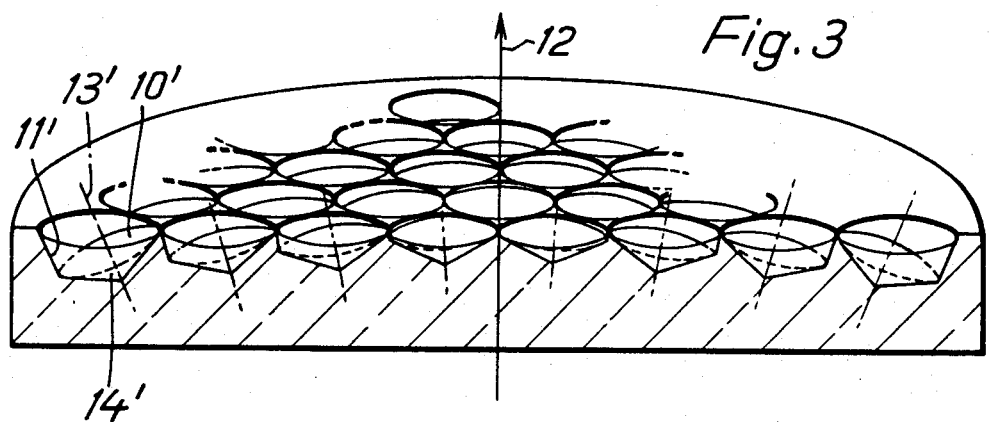
FIG. 3 is a schematic perspective sectional view through a field lens with successive conical impressions located on concentric paths.

In FIG. 3, each deformation consists of a conical impression 14'. The inclination of the base surface 10' increases from path to path in the same manner as the inclination of the effective flank of a corresponding Fresnel echelon lens. The symmetry axis 13' of the impressions nutates on each path around the optical axis 12.

When the impression is produced by means of a cylindrical tool having a conical tip, an interference flank 11' parallel to the symmetry axis 13' is obtained. The tip of the tool may naturally also have a pyramidal or spherical configuration. When, in place of a deformation with a circular base area, a deformation with a regular polygon as the base area is selected, this has the advantage of permitting a closer spacing of the deformations in the plane of the lens with respect to each other, thus filling the lens surfaces to a greater degree.

What is claimed is:

1. A flat field lens having an image splitting effect, comprising:

a generally planar lens of substantially transparent material having an optical axis; and a plurality of deformations of identical cross-sectional configuration formed on concentric paths about the optical axis transparent lens, each of said deformations having at least two light-refracting surfaces which are symmetrical to an axis of the deformation, wherein the axis of symmetry of each deformation lying on the same concentric path has the same inclination with respect to the optical axis and the inclination of the axes of symmetry of deformations located on radially adjacent concentric paths varies with respect to the optical axis.

2. A field lens according to claim 1, wherein the inclination of the axes of symmetry of deformations located on radially adjacent concentric paths varies constantly with respect to the optical axis.

3. A field lens according to claim 1 or 2, wherein the deformations comprise elevations.

4. A field lens according to claim 1 or 2, wherein the deformations comprise depressions.

5. A field lens according to claim 1 or 2, wherein the inclination of the axes of symmetry of deformations located on radially adjacent concentric paths increases in the radial direction.

6. A field lens according to claim 1 or 2, wherein the inclination of the axes of symmetry of deformations located on radially adjacent concentric paths decreases in the radial direction.

7. A field lens according to claim 1, wherein it comprises the form of a Fresnel echelon lens, comprising concentric steps each having an effective flank, wherein said deformations are located on the effective flank of the individual steps.

8. A field lens according to claim 7, wherein each of said deformations comprises the form of a prism.

9. A field lens according to claim 7, wherein each of said deformations comprises the form of a cylindrical lens.

10. A field lens according to claim 1 or 2, wherein each path comprises a plurality of successively placed deformations, each having the form of a pyramid.

11. A field lens according to claim 1 or 2, wherein each path comprises a plurality of successively placed deformations, each having the form of a cone.

12. A field lens according to claim 1 or 2, wherein each path comprises a plurality of successively placed deformations, each having the form of a spherical cap.

13. A field lens according to claim 7, wherein the axis of symmetry of each deformation is perpendicular to the effective flank of each concentric step, which represents the chord of the individual circular arc sections of an imaginary convex lens surface, whereby the axis of symmetry of each deformation is perpendicular to the imaginary convex lens surface.

* * * * *